United States Patent [19]

Heo

[11] Patent Number: 5,414,417
[45] Date of Patent: May 9, 1995

[54] AUTOMATIC INPUT/OUTPUT TERMINAL VARYING CIRCUIT

[75] Inventor: Man H. Heo, Daeku, Rep. of Korea

[73] Assignee: Gold Star Co., Ltd., Seoul, Rep. of Korea

[21] Appl. No.: 19,070

[22] Filed: Feb. 18, 1993

[30] Foreign Application Priority Data

Feb. 18, 1992 [KR] Rep. of Korea ............... 2340/1992

[51] Int. Cl.⁶ .......................................... H04Q 1/00
[52] U.S. Cl. ...................... 340/825.25; 340/825.24; 348/706
[58] Field of Search .............. 340/825.24, 825.25, 340/825.03, 825.8, 826, 825.02; 348/705, 706, 722; H04N 5/268, 5/222; 333/101, 103

[56] References Cited

U.S. PATENT DOCUMENTS

| | | | |
|---|---|---|---|
| 3,840,702 | 10/1974 | Woods | 340/825.03 |
| 4,502,026 | 2/1985 | Imazeki et al. | 333/101 |
| 4,763,012 | 8/1988 | Blankinship | 340/825.25 X |
| 4,808,992 | 2/1989 | Beyers, Jr. et al. | 340/825.24 |
| 4,903,129 | 2/1990 | Bell et al. | 348/706 |
| 4,949,179 | 8/1990 | Hosono | 348/706 |

Primary Examiner—Donald J. Yusko
Assistant Examiner—Edwin C. Holloway, III
Attorney, Agent, or Firm—Ostrolenk, Faber, Gerb & Soffen

[57] ABSTRACT

An automatic input/output terminal varying circuit comprising an input/output terminal section including a plurality of input/output terminals for inputting signals from external signal sources and outputting signals to external systems, an input signal selection section for selecting one of the signals inputted through the input-/output terminal section and a television signal in response to select data from a microcomputer and outputting the selected signal to a signal processor, and a plurality of output signal selection section for outputting the selected signal from the input signal selection section to ones of the input/output terminals of the input-/output terminal section other than one of the input-/output terminals of the input/output terminal section through which the selected signal is inputted, in response to the select data from the microcomputer. Therefore, according to the invention, the terminals not used as input terminals can be used for the output function and the terminals not used as output terminals can be used for the input function. This has the effect of reducing the number of the terminals as compared with the prior art where the terminals are specified as input or output dedicated terminals.

2 Claims, 4 Drawing Sheets

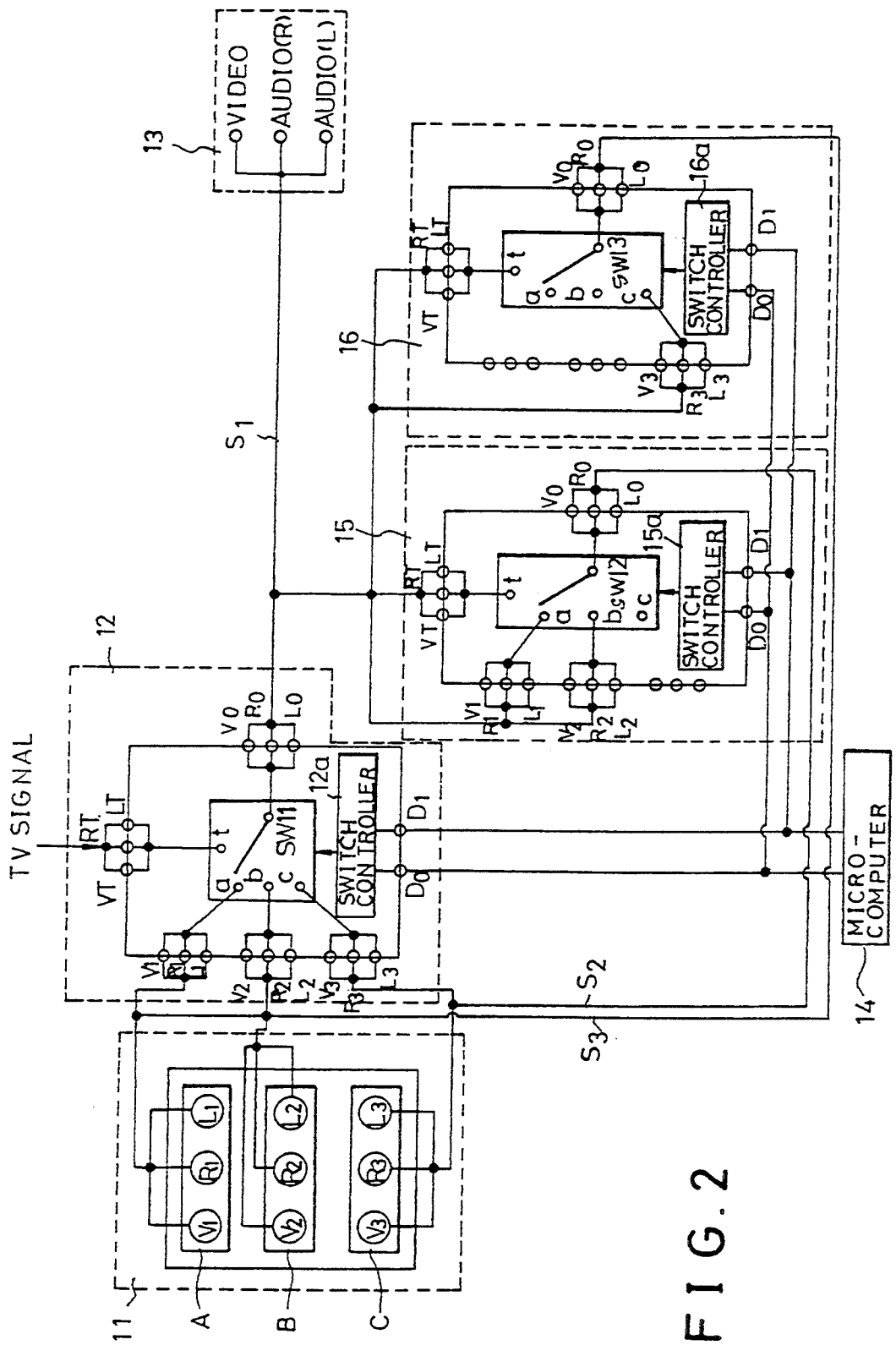
F I G. 2

FIG.3

| | USAGE OF TERMINALS | EXTERNAL SIGNAL INPUT | | $D_0$ | $D_1$ | $S_1$ | $S_2$ | $S_3$ | A | B | C |
|---|---|---|---|---|---|---|---|---|---|---|---|
| A | INPUT:3 OUTPUT:0 | T V | 0 | 0 | 0 | T V | T V | T V | T V | T V | T V |
| | | A | 0 | 0 | 1 | A | A | X | X | X | A |
| | | B | 0 | 1 | 0 | B | B | X | X | X | B |
| | | C | 0 | 1 | 1 | C | X | C | C | C | X |
| B | INPUT:2 OUTPUT:1 | T V | 0 | 0 | 0 | T V | T V | T V | T V | T V | T V |
| | | A | 0 | 0 | 1 | A | A | X | X | X | X |
| | | B | 0 | 1 | 0 | B | B | X | X | X | B |
| | | C | OUTPUT | 1 | 1 | X | X | X | X | X | X |
| C | INPUT:1 OUTPUT:2 | T V | 0 | 0 | 0 | T V | T V | T V | T V | T V | T V |
| | | A | OUTPUT | 0 | 1 | X | X | X | X | X | X |
| | | B | OUTPUT | 1 | 0 | X | X | X | X | X | X |
| | | C | 0 | 1 | 1 | C | X | C | C | C | X |
| D | INPUT:0 OUTPUT:3 | T V | 0 | 0 | 0 | T V | T V | T V | T V | T V | T V |
| | | A | OUTPUT | 0 | 1 | X | X | X | X | X | X |
| | | B | OUTPUT | 1 | 0 | X | X | X | X | X | X |
| | | C | OUTPUT | 1 | 1 | X | X | X | X | X | X |

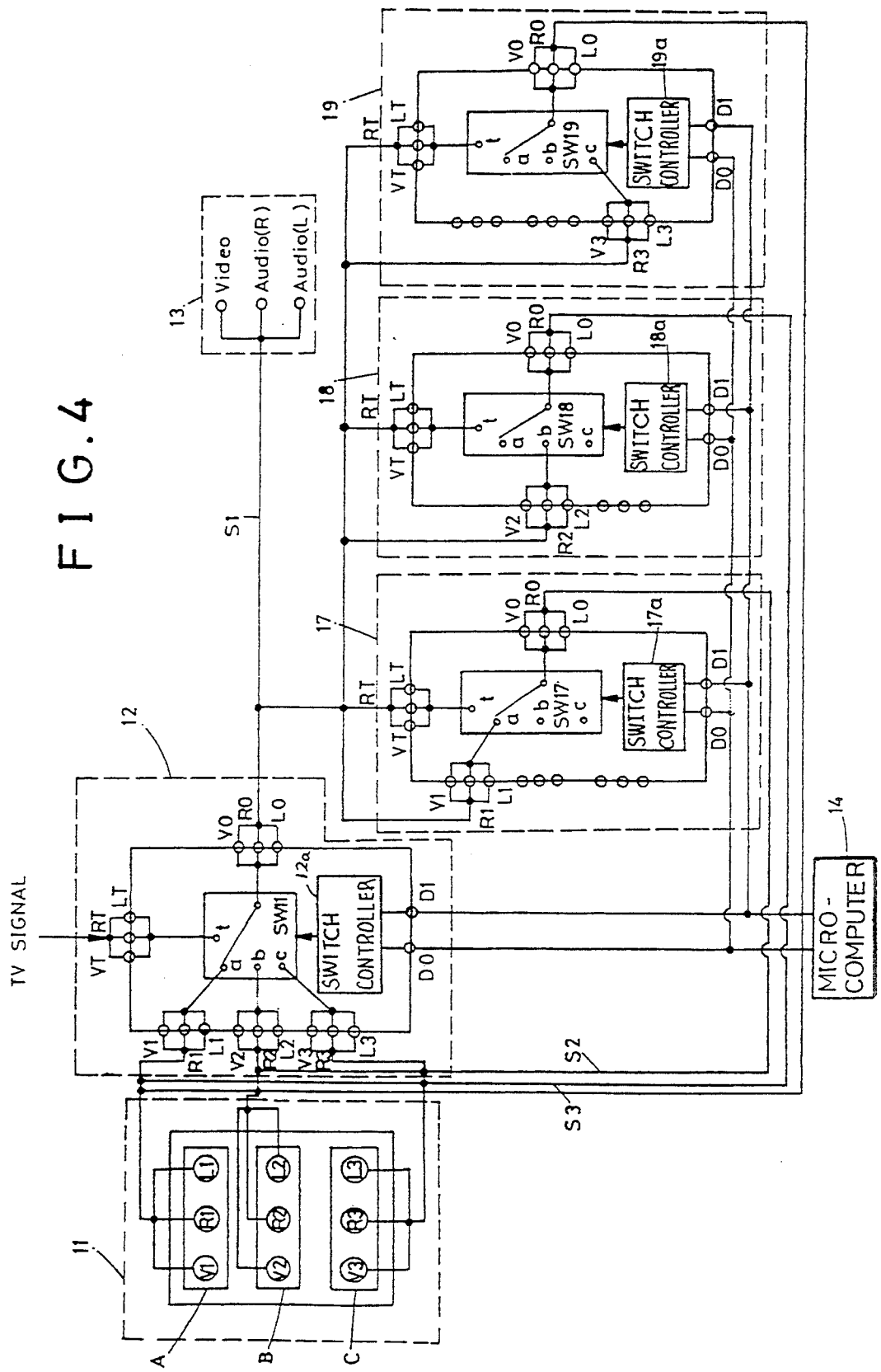

AUTOMATIC INPUT/OUTPUT TERMINAL VARYING CIRCUIT

BACKGROUND OF THE INVENTION

1. Field of the Invention

The present invention relates in general to an input/output terminal circuit for a system such as a video cassette recorder, and more particularly to an automatic input/output terminal varying circuit for automatically varying input/output terminals to output terminals and input terminals, respectively, in accordance with a user's input signal selection so that the usefulness of the input/output terminals can be increased.

2. Description of the Prior Art

Referring to FIG. 1, there is shown a circuit diagram of a conventional signal input/output terminal circuit. As shown in this drawing, the signal input/output terminal circuit comprises an input/output terminal section 1 for inputting external video signals and external right and left audio signals and outputting a video signal and right and left audio signals. The input/output terminal section 1 has a plurality of sets of a video terminal V and two audio terminals R and L. A signal selection section 2 is provided to select one of the input video and audio signal sets from the input/output terminal section 1 and a television (TV) signal from a tuner in response to select data D0 and D1 from a microcomputer 4 and output, the selected signals to a signal processor 3 is noted herein that the TV signal includes a set of a video signal and right and left audio signals.

FIG. 1, the input/output terminal section 1 is shown to have two sets of input terminals A (V1, R1 and L1) and B (V2, R2 and L2) and a set of output terminals C (V3, R3 and L3). Also, the signal selection section 2 includes a select switch SW1 for selecting one of the input video and audio signal sets from the input/output terminal section 1 and the TV signal from the tuner and outputting the selected signals to the signal processor 3 and a switch controller 2a for generating a select control signal to the select switch SW1 in response to the select data D0 and D1 from the microcomputer 4. The select switch SW1 and the switch controller 2a are arranged on a single chip. The signal output terminals C in the input/output terminal section 1 are connected directly to an signal output line of the select switch SW1 to output the selected signals from the selects switch SW1 externally.

The operation of the conventional signal input/output terminal circuits with the above-mentioned construction will hereinafter be described.

First, the video signals V and the audio signals R and L from external signal sources (not shown) are inputted through the input terminals A and B in the input/output terminal section 1 and then applied to fixed terminals a and b of the select switch SW1 in the signal selection section 2. Also, the TV signal is applied to a fixed terminal t of the select switch SW1. At this time, when the user selects one of the inputted signals using a keyboard (not shown) or a select switch (not shown) to watch it the microcomputer 4 generates the select data D0 and D1 to the signal selection section 2 according to the user's selection.

The switch controller 2a controls the selection of the select switch SW1 in response to the select data D0 and D1 from the microcomputer 4. Under the control of the switch controller 2a, the select switch SW1 selects a set of the video signal V and the audio signals R and L of one of the input signal s through the input terminals A and B in the input/output terminal section 1 and the TV signal from the tuner. Then, the select switch SW1 outputs the selected signals to the signal processor 3 and through the output terminals C in the input/output terminal section 1 to an external system.

However, the conventional signal input/output terminal circuit has a disadvantage, in that the input/output terminals can perform only their specified input/output functions. Namely, the input terminals not used presently cannot be used for the output function and the output terminals not used presently cannot be used for the input function. This results in an increase in the number of the input/output terminals when the input and output signals are desired above a predetermined number. In this case, the input/output terminal section possesses a larger area and the usefulness of the input/output terminals are reduced.

SUMMARY OF THE INVENTION

Therefore, the present invention has been made in view of the above problem, and it is an object of the present invention to provide an automatic input/output terminal varying circuit for automatically varying input/output terminals to output terminals and input terminals, respectively, in accordance with a user's input signal selection so that the usefulness of the input/output terminals can be increased.

In accordance with the present invention, the above and other objects can be accomplished by a provision of an automatic input/output terminal varying circuit comprising: input/output terminal means including a plurality of input/output terminals for inputting signals from external signal sources and outputting signals to external systems; input signal selection means for selecting one of the signals inputted through said input/output terminal means and a television signal in response to select data from a microcomputer and outputting the selected signal to a signal processor; and a plurality of output signal selection means for outputting the selected signal from said input signal selection means to ones of the input/output terminals of said input/output terminal means other than one of the input/output terminals of said input/output terminal means through which the selected signal is inputted, in response to the select data from said microcomputer.

BRIEF DESCRIPTION OF THE DRAWINGS

The above and other objects, features and advantages of the present invention will be more clearly understood from the following detailed description taken in conjunction with the accompanying drawings, in which:

FIG. 2 is a circuit diagram of an embodiment of an automatic input/output terminal varying circuit in accordance with the present invention;

FIG. 3 illustrates at A, B, C; D varied states of terminals in the circuit in FIG. 2; and FIG. 4 is a circuit diagram of an alternative embodiment of the automatic input/output terminal varying circuit in accordance with the present invention.

DETAILED DESCRIPTION OF THE PREFERRED EMBODIMENTS

Figure 1:
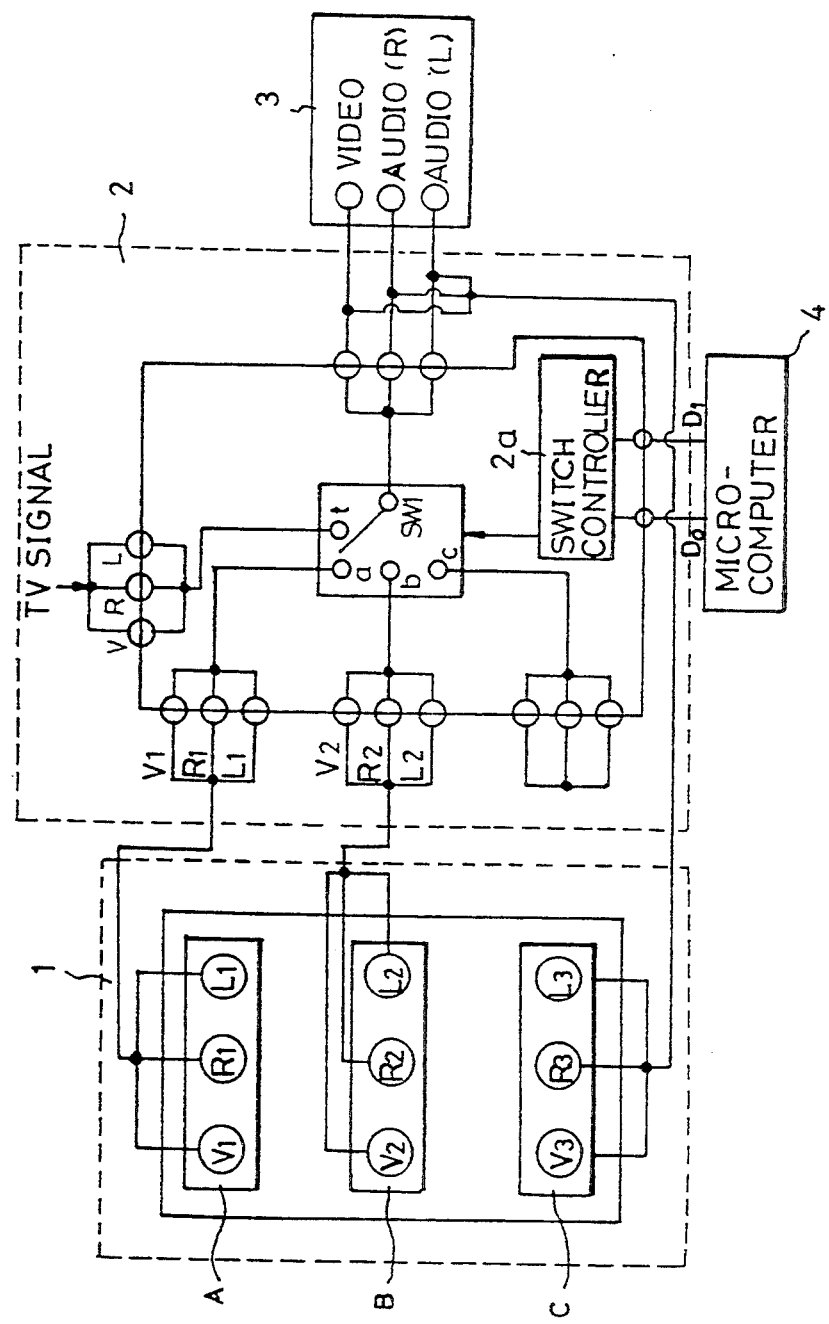
FIG. 1 is a circuit diagram of a conventional signal input/output terminal circuit.

Referring to FIG. 2, there is shown a circuit diagram of an embodiment of an automatic input/output terminal varying circuit in accordance with the present invention. As shown in this drawing, the automatic input/output terminal varying circuit of the present invention comprises an input/output terminal section 11 including a plurality of input/output terminals A, B and C each having a video terminal V and two audio terminals R and L connected to an external system, for inputting and outputting a video signal V and right and left audio signals R and L. An input signal selection section 12 includes external signal input terminals a, b and c connected to the input/output terminals A, B and C of the input/output terminal section 11, respectively, and a TV signal input terminal t. The input signal selection section 12 selects one of the signals inputted through its external signal input terminals a, b and c and its TV signal input terminal t in response to select data D0 and D1 from a microcomputer 14 and outputs the selected signal to a signal processor 13.

The automatic input/output terminal varying circuit of the present invention also comprises a first output signal selection section 15 including external signal input terminals a, b and c and a TV signal input terminal t. The first output signal selection section 15 inputs an output signal from the input signal selection section 12 commonly through its TV signal input terminal t and its external signal input terminals a and b, performs the same signal selection as that of the input signal selection section 12 in response to the select data D0 and D1 from the microcomputer 14 and outputs the selected signal to the input/output terminal C of the input/output terminal section 11 corresponding to its external signal input terminal c of free state.

A second output signal selection section 16 includes external signal input terminals a, b and c and a TV signal input terminal t. The second output signal selection section 16 inputs the output signal from the input signal selection section 12 commonly through its TV signal input terminal t and its external signal input terminal c, performs the same signal selection as that of the input signal selection section 12 in response to the select data D0 and D1 from the microcomputer 14 and outputs the selected signal commonly to the input/output terminals A and B of the input/output terminal section 11 corresponding to its external signal input terminals a and b of free state.

The input signal selection section 12 and the first and second output signal selection sections 15 and 16 are of the same construction. Namely, the input signal selection section 12 and the first and second output signal selection sections 15 and 16 each includes, on a single chip, a switch controller 12a, 15a and 16a for generating a select control signal in response to the select data D0 and D1 from the microcomputer 14 and a switch SW11, SW12 and SW13 for selecting one of the signals inputted through the external input terminals a, b and c and the TV signal input terminal t in response to the select control signal from the switch controller 12a, 15a and 16a.

The operation of the automatic input/output terminal varying circuit with the above-mentioned construction in accordance with the present invention will hereinafter be described in detail.

For convenience' sake, the input/output terminals A, B and C in the input/output terminal section 11 will be expressed as A, B and C terminals, respectively, and the signals inputted through the A, B and C terminals will be expressed as A, B and C signals.

The input signal selection section 12 selects one of the A, B and C signals and the TV signal inputted through the A, B and C terminals of the input/output terminal section 11 in response to the select data D0 and D1 from the microcomputer 14. The first output signal selection section 15 selects the output signal from the input signal selection section 12 in response to the select data D0 and D1 from the microcomputer 14 and outputs the selected signal to the C terminal of the input/output terminal section 11. The second output signal selection section 16 selects the output signal from the input signal selection section 12 in response to the select data D0 and D1 from the microcomputer 14 and outputs the selected signal to the A and B terminals of the input/output terminal section 11. Therefore, a part or all of the A, B and C terminals in the input/output signal terminal section 11 can be used as input terminals. Also, a part or all of the terminals not used as the input terminals can be used as output terminals.

For example, provided that the user selects the A signal inputted through the A terminal of the input/output terminal section 11 under the condition that an external signal source is connected to the A terminal of the input/output terminal section 11 and an external system as an output target is connected to the C terminal thereof, the microcomputer 14 generates the select data D0 and D1 according to the user's selection and the switch SW11 in the input signal selection section 12 selects its A signal input terminal a in response to the select data D0 and D1 from the microcomputer 14. At this time, the switches SW12 and SW13 in the first and second output signal selection sections 15 and 16 select their terminals a in response to the select data D0 and D1 from the microcomputer 14 in the same manner as that of the input signal selection section 12. As a result the first output signal selection section 15 selects the A signal selected by the input signal selection section 12 and outputs the selected A signal to the C terminal of the input/output terminal section 11. In result the A signal is outputted to the target external system.

Referring to FIG. 3, there are illustrated varied states of the A, B and C terminals in the automatic input/output terminal varying circuit in accordance with the present invention. In these drawings, the reference numeral S1 designates the output signal from the input signal selection section 12, S2 the output signal from the first output signal selection section 15 and S3 the output signal from the second output signal selection section 16, respectively.

When all of the A, B and C terminals in the input/output terminal section 11 are used as input terminals as shown in FIG. 3 part A, the input signal selection section 12 selects one of the TV signal and the A, B and C signals in response to the select data D0 and D1 from the microcomputer 14.

In the case where the A and B terminals in the input/output terminal section 11 are used as input terminals and the C terminal therein is used as an output terminal as shown in FIG. 3 part B, the input signal selection section 12 selects one of the TV signal and the A and B signals in response to the select data D0 and D1 from the microcomputer 14. In this case, the first output signal selection section 15 outputs the output signal from the input signal selection section 12 to the C terminal of the input/output terminal section 11. As a result the C terminal of the input/output terminal section 11 is used as an output terminal for outputting one of the TV signal and the A and B signals.

Also, when the A and B terminals in the input/output terminal section 11 are used as output terminals and the C terminal therein is used as an input terminal as shown in FIG. 3 part C, the input signal selection section 12 selects one of the TV signal and the C signal in response to the select data D0 and D1 from the microcomputer 14. In this case, the second output signal selection section 16 outputs the output signal from the input signal selection section 12 to the A and B terminals of the input/output terminal section 11. As a result, the A and B terminals of the input/output terminal section 11 are used as output terminals for outputting one of the TV signal and the C signal.

On the other hand, in the case where al 1 of the A, B and C terminals in the input/output terminal section 11 are used as output terminals as shown in FIG. 3 part D, the input signal selection section 12 selects the TV signal in response to the select data D0 and D1 from the microcomputer 14. In this case, the first output signal selection section 15 outputs the selected TV signal from the input signal selection section 12 to the C terminal of the input/output terminal section 11 and the second output signal selection section 16 outputs the selected TV signal from the input signal selection section 12 to the A and B terminals of the input/output terminal section 11. As a result, all of the A, B and C terminals of the input/output terminal section 11 are used as output terminals for outputting the TV signal.

Referring to FIG. 4, there is shown a circuit diagram of an alternative embodiment of the automatic input-/output terminal varying circuit in accordance with the present invention. The construction in this drawing is substantially the same as that in FIG. 2, with the exception that three output signal selection sections 17, 18 and 19 are provided in the circuit. The output terminal of the input signal selection section 12 is connected commonly to a TV signal input terminal t and an external signal input terminal a of the first output signal selection section 17, a TV signal input terminal t and an external signal input terminal b of the second output signal selection section 18 and a TV signal input terminal t and an external signal input terminal c of the third output signal selection section 19. Also, the output terminal of the first output signal selection section 17 is connected commonly to the B and C terminals of the input/output terminal section 11, the output terminal of the second output signal selection section 18 is connected commonly to the A and C terminals of the input/output terminal section 11 and the output terminal of the third output signal selection section 19 is connected commonly to the A and B terminals of the input/output terminal section 11.

As seen from FIG. 4, the A, B and C terminals of the input/output terminal section 11 can be used individually as input terminals or output terminals in accordance with the second embodiment of the present invention, while the A and B terminals of the input/output terminal section 11 can be used simultaneously as input terminals or output terminals in accordance with the first embodiment of the present invention.

For example, provided that an external signal source is connected to the A terminal of the input/output terminal section 11 and the A signal is selected by the user, the input signal selection section 12 selects the A signal. In this case, the first output signal selection section 17 outputs the selected A signal from the input signal selection section 12 to the B and C terminals of the input-/output terminal section 11. As a result the A terminal of the input/output terminal section 11 is used as an input terminal and the B and C terminals thereof are used as output terminals.

As hereinbefore described, according to the present invention, the plurality of input/output terminals are not specified as input or output dedicated terminals. Namely, the input signal to the signal processor is outputted to the terminals other than a terminal for inputting a signal. This results in a convenience in use. Also, the terminals not used as input terminals can be used for the output function and the terminals not used as output terminals can be used for the input function. This has the effect of reducing the number of the terminals as compared with the prior art where the terminals are specified as input or output dedicated terminals.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic input/output terminal varying circuit comprising:

input/output terminal means including a plurality of input/output terminals for inputting signals from external signal sources and outputting signals to external systems;

input signal selection means for selecting one of the signals inputted through said input/output terminal means and a television signal in response to select data from a microcomputer and outputting the selected signal to a signal processor; and a plurality of output signal selection means for outputting the selected signal from said input signal selection means to ones of the input/output terminals of said input/output terminals means other than one of the input/output terminals of said input/output terminal means through which the selected signal is inputted, in response to the select data from said microcomputer, said plurality of output signal selection means including:

first output signal selection means including first to third external signal input terminals and a television signal input terminal, for inputting an output signal from said input signal selection means commonly through its television signal input terminal and its first and second external signal input terminals, performing the same signal selection as that of said input signal selection means in response to the select data from said microcomputer and outputting the selected signal to one of the input/output terminals of said input/output terminal means corresponding to its third external signal input terminal of free state; and second output signal selection means including first to third external signal input terminals and a television signal input terminal, for inputting the output signal from said input signal selection means commonly through its television signal input terminal and its third external signal input terminal, performing the same signal selection as that of said input signal selection means in response to the select data from said microcomputer and outputting the selected signal commonly to ones of the input/output terminals of said input/output terminal means corresponding to its first and second external signal input terminals of free state.

2. An automatic input/output terminal varying circuit comprising:

input/output terminal means including a plurality of input/output terminals for inputting signals from external signal sources and outputting signals to external systems;

input signal selection means for selecting one of the signals inputted through said input/output terminal means and a television signal in response to select data from a microcomputer and outputting the selected signal to a signal processor; and a plurality of output signal selection means for outputting the selected signal from said input signal selection means to ones of the input/output terminals of said input/output terminal means other than one of the input/output terminals of said input/output terminal means through which the selected signal is inputted, in response to the selected data from said microcomputer, said plurality of output signal selection means including:

first output signal selection means including first to third external signal input terminals and a television signal input terminal, for inputting an output signal from said input signal selection means commonly through its television signal input terminal and its first external signal input terminal, performing the same signal selection as that of said input signal selection means in response to the select data from said microcomputer and outputting the selected signal to ones of the input/output terminals of said input/output terminal means corresponding to its second and third external signal input terminals of free state;

second output signal selection means including first to third external signal input terminals and a television signal input terminal, for inputting the output signal from said input signal selection means commonly through its television signal input terminal and its second external signal input terminal, performing the same signal selection as that of said input signal selection means in response to the select data from said microcomputer and outputting the selected signal commonly to ones of the input/output terminals of said input/output terminal means corresponding to its first and third external signal input terminals of free state; and third output signal selection means including first to third external signal input terminals and a television signal input terminal, for inputting the output signal from said input signal selection means commonly through its television signal input terminal and its third external signal input terminal, performing the same signal selection as that of said input signal selection means in response to the select data from said microcomputer and outputting the selected signal commonly to ones of the input/output terminals of said input/output terminal means corresponding to its first and second external signal input terminals of free state.

* * * * *